(12) United States Patent
Otsuka et al.

(10) Patent No.: US 7,170,834 B2
(45) Date of Patent: Jan. 30, 2007

(54) METHOD AND CIRCUIT FOR DETECTING PLAYBACK SIGNAL WHICH IS COMPENSATED FOR TIME DELAY

(75) Inventors: Tatsuhiro Otsuka, Suwon (KR); Seong-sin Joo, Suwon (KR); Chong-sam Chung, Seongnam (KR); Young-man Ahn, Suwon (KR); In-sik Park, Suwon (KR); Hea-jung Suh, Seongnam (KR); Byung-in Ma, Suwon (KR); Byoung-ho Choi, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 135 days.

(21) Appl. No.: 10/861,404

(22) Filed: Jun. 7, 2004

(65) Prior Publication Data

US 2004/0218489 A1    Nov. 4, 2004

Related U.S. Application Data

(62) Division of application No. 09/563,430, filed on May 3, 2000.

(30) Foreign Application Priority Data

May 3, 1999    (KR) ............................... 1999-15891

(51) Int. Cl.
G11B 7/00 (2006.01)
(52) U.S. Cl. .................................................. 369/44.41
(58) Field of Classification Search ............. 369/44.41; G11B 7/095
See application file for complete search history.

(56) References Cited

U.S. PATENT DOCUMENTS

| | | | |
|---|---|---|---|
| 4,896,309 A | 1/1990 | Yamakawa et al. | |
| 5,031,167 A * | 7/1991 | Ishibashi et al. | 369/44.34 |
| 5,073,886 A * | 12/1991 | Sasaki et al. | 369/124.14 |
| 5,231,280 A | 7/1993 | Imakawa | |
| 5,276,664 A | 1/1994 | Shikunami | |
| 5,315,572 A | 5/1994 | Akatsuka et al. | |
| 5,428,455 A | 6/1995 | Josoya et al. | |

(Continued)

FOREIGN PATENT DOCUMENTS

EP    0541209 A2    5/1993

(Continued)

Primary Examiner—A M Psitos
(74) Attorney, Agent, or Firm—Stein, McEwen & Bui, LLP

(57) ABSTRACT

A method of and a circuit for providing a playback signal, which is compensated for time delay, from a photodetector having a plurality of outputs. A time difference between a first signal corresponding to a part of the outputs of the photodetector and a second signal corresponding to another part of the outputs of the photodetector is detected and one of the first and second signals is temporally shifted to compensate for a time delay between different outputs of the photodetector. The temporally shifted signal is summed with the other signal to provide a playback signal. Accordingly, the time delay between the outputs of the photodetector is compensated, thereby increasing the degree of modulation of the data playback signal. In addition, distortion or degradation of the signal is suppressed and occurrence of errors in the playback signal is minimized, thereby improving the reliability of the playback signal.

6 Claims, 4 Drawing Sheets

U.S. PATENT DOCUMENTS 5,544,141 A * 8/1996 Kawasaki ............ 369/47.17
5,703,852 A 12/1997 Kumagai
6,058,093 A * 5/2000 Kato et al. ............ 369/124.14
6,317,395 B1 11/2001 Yamamoto et al.
6,456,574 B1 9/2002 Kato

FOREIGN PATENT DOCUMENTS

| JP | 64-76425 | 3/1989 |
| JP | 1-232540 | 9/1989 |
| JP | 2-232867 | 9/1990 |
| JP | 7-98938 | 4/1995 |
| JP | 63-25832 | 2/1998 |
| JP | 63-311628 | 12/1998 |

* cited by examiner

METHOD AND CIRCUIT FOR DETECTING PLAYBACK SIGNAL WHICH IS COMPENSATED FOR TIME DELAY

CROSS-REFERENCE TO RELATED APPLICATIONS

This application is a divisional application of Ser. No. 09/563,430 filed May 3, 2000, now pending, and claims the benefit of Korean Application No. 99-15891, filed May 3, 1999, in the Korean Patent Office, the disclosure of which is incorporated herein by reference.

BACKGROUND OF THE INVENTION

1. Field of the Invention

The present invention relates to playback of information from an optical recording medium, and more particularly, to a method and circuit for compensating for time delay between the outputs of a photodetector and detecting a playback signal.

2. Description of the Related Art

In a recording and/or playback apparatus which detects data from an optical recording medium such as a compact disc (CD) or a digital versatile disc (DVD), on which the data is recorded in the form of pits formed on a substrate, by irradiating the pits with light and comparing the amount of reflected light, signals are degraded due to a time delay between the outputs of a photodetector, which is caused by different conditions (width, length, depth, angle, etc) of shapes of data pits, and a time delay which is caused by tangential interference between data.

In conventional detection of a playback signal, as shown in FIG. 1, a pickup unit (P/U) 102 applies a beam emitted from a light source (a laser diode) to a disc 100 to detect information recorded on the disc 100. Then, a multi-division photodetector 104 (also known as a detection sensor), which is usually composed of a photo diode, multi-divides an optical signal reflected from the disc 100 and detects it.

First through fourth current to voltage converters (I/Vs) 106, 108, 110 and 112 respectively convert the multichannel outputs A, B, C and D, which are provided from the photodetector 104 in the form of current signals, into voltage signals. An operational unit 114 sums the voltage signals from the I/Vs 106, 108, 110 and 112 to provide a playback signal RF SUM of a radio frequency (RF).

In a conventional technology which detects a playback signal of data by simply summing the outputs of the I/Vs 106, 108, 110 and 112, the playback signal may be distorted or degraded during operation due to time delay between the outputs of the I/Vs 106, 108, 110 and 112, which is caused by different shape conditions of data pits formed on a disc and interference between data.

Meanwhile, for optical discs, a large recording capacity and high speed playback is desired for recording and/or playback of high definition (HD) images. Moreover, as the characteristics of systems move toward high density and high multiple-speed, distortion and degradation of playback signals become more serious, and thus a great deal of labor and additional cost are incurred when implementing systems. The time delay between the outputs of a photodetector causes distortion of a playback signal. When the amplitude of a playback signal is not normally detected, the performance of a system is decreased.

SUMMARY OF THE INVENTION

To solve the above problem, a first object of the present invention is to provide a method of compensating for time delay, which is caused by different shape conditions of data pits recorded on an optical recording medium and interference between data, and detecting a playback signal.

A second object of the present invention is to provide a circuit for compensating for time delay, which is caused by different shape conditions of data pits recorded on an optical recording medium and interference between data, and detecting a playback signal.

Additional objects and advantages of the invention will be set forth in part in the description which follows, and, in part, will be obvious from the description, or may be learned by practice of the invention.

To achieve the first object and other objects, the present invention provides a method of detecting a playback signal using a photodetector which multi-divides an optical signal reflected from an optical recording medium for detection. The method includes the steps of detecting a time difference between outputs of the photodetector and temporally matching part of the outputs of the photodetector and the other part of the outputs of the photodetector, between which the time difference occurs, to compensate for time delay of the part of the outputs of the photodetector, and summing the part of the outputs of the photodetector, which is compensated for the time delay, and the other part of the outputs of the photodetector to provide a playback signal.

To achieve the second object and other objects, the present invention provides a playback signal detection circuit in an optical recording and/or playback apparatus including a photodetector which multi-divides an optical signal reflected from an optical recording medium for detection. The circuit includes a time delay compensator for detecting a time difference between outputs of the photodetector and temporally matching part of the outputs of the photodetector and the other part of the outputs of the photodetector, between which the time difference occurs, to compensate for time delay of the part of the outputs of the photodetector, and an operational unit for summing the part of the outputs of the photodetector, which is compensated for the time delay, and the other part of the outputs of the photodetector to provide a playback signal. Since contributors to time delay include defocus, detrack, radial tilt and tangential tilt, defocus margin, detrack margin, radial tilt margin and tangential tilt margin are improved by compensating the playback signal for time delay.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
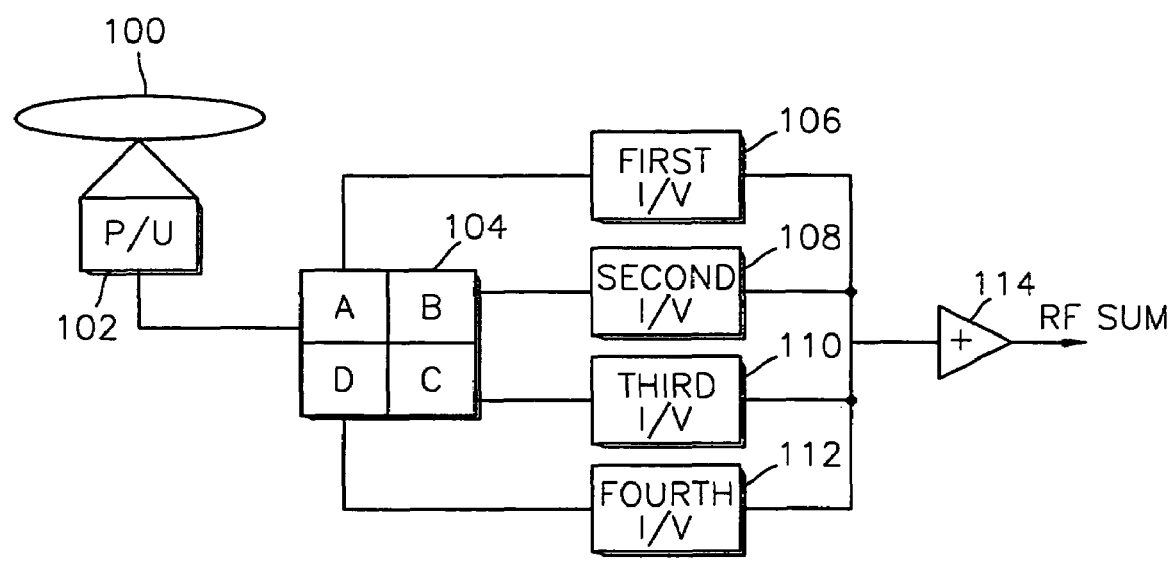
FIG. 1 is a diagram illustrating the principle of conventional detection of a playback signal.

Reference will now be made in detail to the present preferred embodiment of the present invention, examples of which are illustrated in the accompanying drawings, wherein like reference numerals refer to the like elements throughout. The embodiment is described below in order to explain the present invention by referring to the figures.

Figure 2:
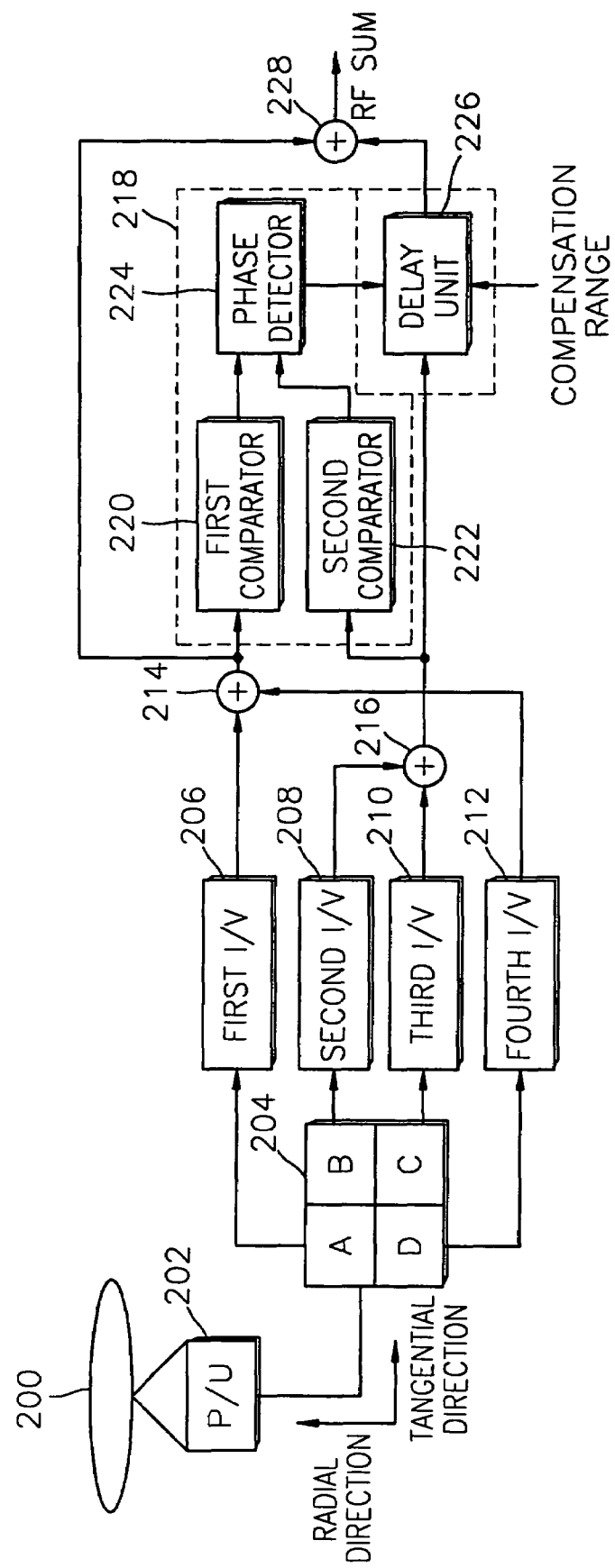
FIG. 2 is a circuit diagram of a playback signal detection circuit according to an embodiment of the present invention.

Referring to FIG. 2, a playback signal detection circuit according to an embodiment of the present invention detects time delay of a playback signal, which is caused by different shape conditions of data pits recorded on a disc or interference between data, by comparing the phases of the outputs of an n-division photodetector, and continuously or partially compensates for the time delay.

More specifically, a pickup unit (P/U) 202 moves to a position, at which desired information can be detected from a disc 200, and applies a beam, which is emitted from a light source (a laser diode) within the P/U 202, to the disc 200. An n (4 in this embodiment)—division photodetector 204 multi-divides to detect an optical signal reflected from the disc 200.

First through fourth current to voltage converters (I/Vs) 206, 208, 210 and 212 respectively convert the multichannel outputs A, B, C and D, which are provided from the photodetector 204 in the form of current signals, into voltage signals.

Figure 3:
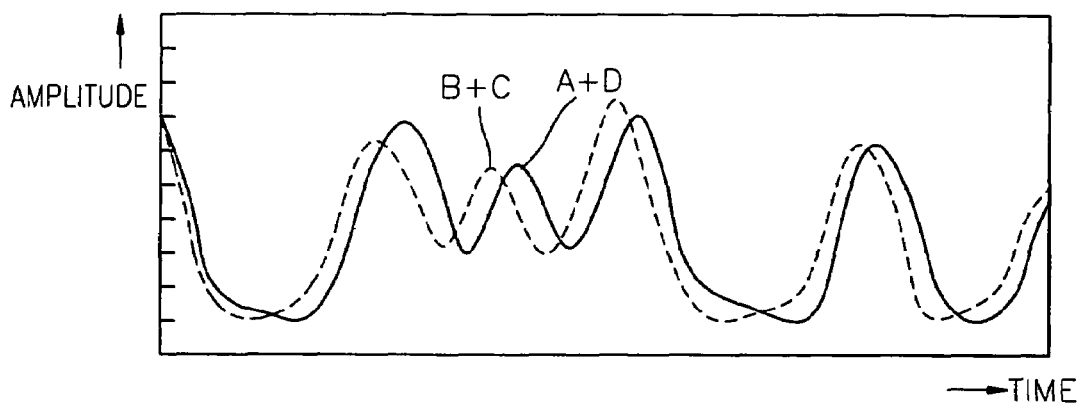
FIG. 3 is a diagram illustrating waveforms of the outputs of the photodetector of FIG. 2 when a time delay occurs.

A first adder 214 adds the voltage signal of the first I/V 206, which corresponds to the output A of the photodetector 204, to the voltage signal of the fourth I/V 212, which corresponds to the output D of the photodetector 204. A second adder 216 adds the voltage signal of the second I/V 208, which corresponds to the output B of the photodetector 204, to the voltage signal of the third I/V 210, which corresponds to the output C of the photodetector 204. The outputs A and D of the photodetector 204 are positioned on the same line in a tangential direction, and the outputs B and C of the photodetector 204 are positioned on the same line in the tangential direction. Accordingly, as shown in FIG. 3, a time delay occurs between the output A+D (which can be referred to as the sum of first outputs) of the photodetector 204, which is provided from the first adder 214, and the output B+C (which can be referred to as the sum of second outputs) of the photodetector 204, which is provided from the second adder 216, in the tangential direction due to different shape conditions of data pits and interference between data. In FIG. 3, the phase of the output B+C of the photodetector 204 leads the phase of the output A+D of the photodetector 204. Accordingly, a time delay compensator 218 compensates the output B+C of the photodetector 204 for the time delay which is caused by different conditions of data pits and interference between data.

A first comparator 220 compares the output of the first adder 214 with a reference signal to convert the output into a binarized signal. A second comparator 222 compares the output signal of the second adder 216 with a reference signal to convert the output into a binarized signal. The first and second comparators 220 and 222 have a function of binarizing analog voltage signals.

Figure 4:
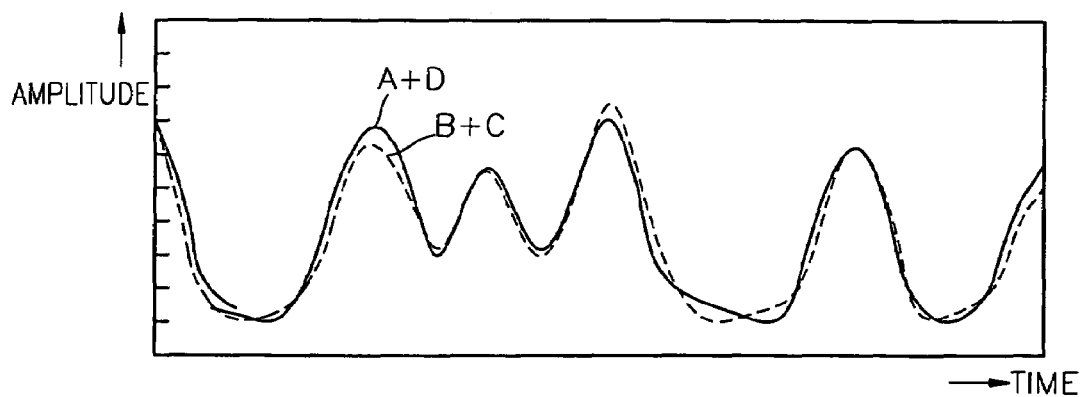
FIG. 4 is a diagram illustrating waveforms of the outputs of the photodetector when a time delay is compensated for according to the present invention.

A phase detector 224 compares the phase of the output of the first comparator 220 with the phase of the output of the second comparator 222 to detect a phase error. A delay unit 226 temporally shifts the output B+C of the photodetector 204, which is provided from the second adder 216, by the phase error, which is provided from the phase detector 224, to compensate for the time delay as shown in FIG. 4. The delay unit 226 may adopt a continuous time delay compensation in which the phase difference between the outputs of the photodetector 204 is continuously detected depending on a predetermined range of compensation for compensation of time delay, thereby being adaptive to all data, or a partial time delay compensation which is adaptive to data only having a predetermined period according to the characteristics of a playback signal, such as for example, the degree of modulation.

Generally, in case of a DVD, the length of a mark recorded on a disc is in the range of 3T to 14T where T means a unit clock cycle. Accordingly, the delay unit 226 may set a compensation range to the range of all data (3T–14T) to compensate for time delay. Alternatively, the delay unit 226 may partially (or intermittently) compensate for time delay with respect to data of a short period (for example, 3T). It is generally known that if the time delay of data of a short period is compensated for, the time delay of the other data can be ignored. The delay unit 226 acts as a time shifter, and a third adder 228 can be referred to as an operational unit. A system controller (not shown) determines a predetermined period to set the compensation range. For example, the system controller provides a window corresponding to a short-period, for example 3T, as the compensation range so as to perform a partial time delay compensation, or a logic "high" signal as the compensation range so as to perform a time delay compensation of all of the data.

The third adder 228 sums the output of the first adder 214 and the output of the delay unit 226 and provides a playback signal RF SUM which is compensated for time delay.

Figure 5:
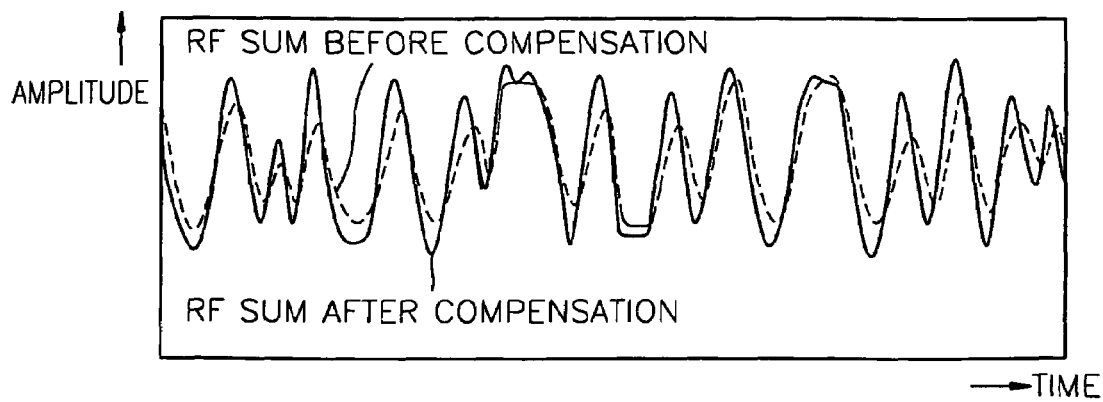
FIG. 5 is a diagram for comparing a playback signal before compensation with a playback signal after compensation to provide an understanding of the present invention.

FIG. 5 is a waveform diagram for comparing playback signals RF SUM before and after compensation of delay time which is caused by different shape conditions of data pits and interference between data. As seen from FIG. 5, the amplitude of the playback signal RF SUM after time delay compensation is larger than that of the playback signal RF SUM before time delay compensation. Accordingly, the degree of modulation of a playback signal RF SUM is improved. The degree of modulation is determined by the ratio of a short-period signal to a long-period signal. If the degree of modulation of a signal, which is most essential in signal processing, is improved, distortion and degradation of the signal can also be improved, thereby enhancing the performance of the system. In particular, when a playback signal whose degree of modulation has been improved is used, a defocus margin, a detrack margin, a radial tilt margin and a tangential tilt margin are increased, so that the performance of the system can be improved.

Figure 6:
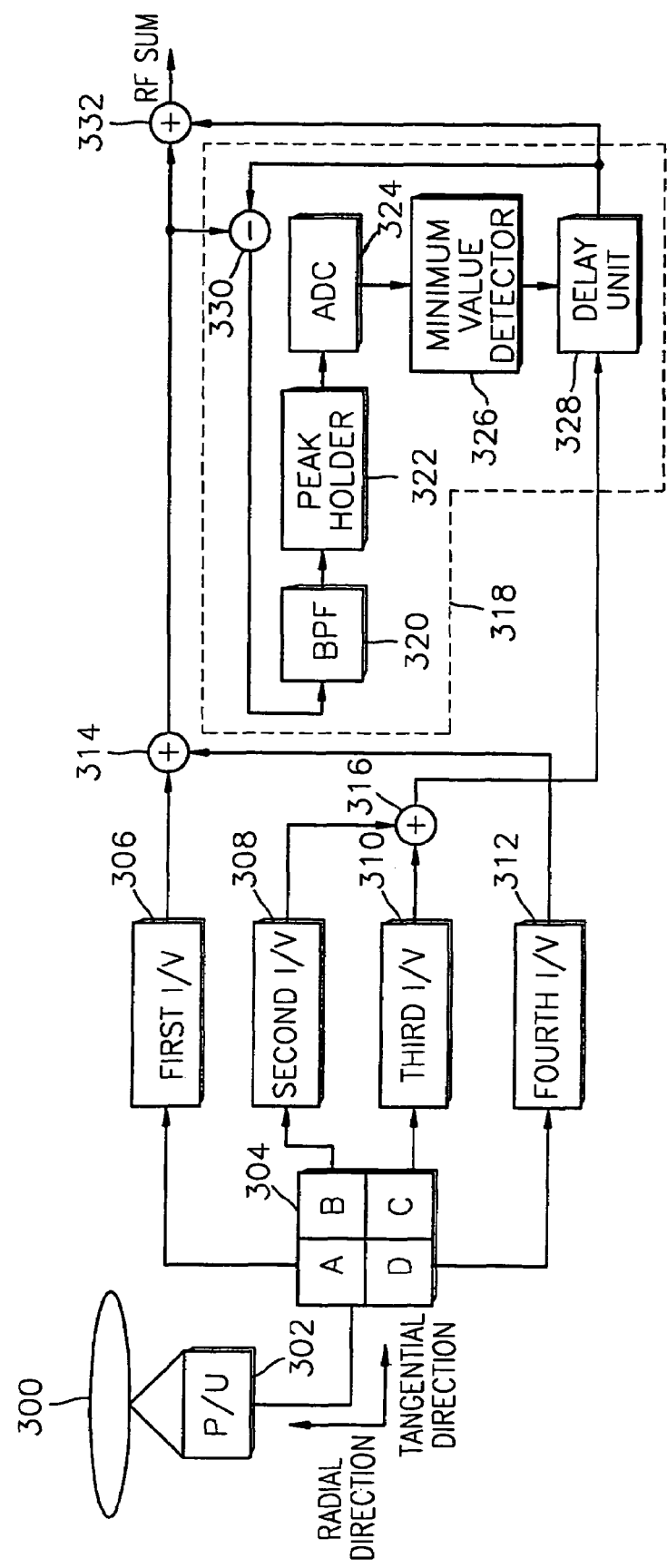
FIG. 6 is a circuit diagram of a playback signal detection circuit according to another embodiment of the present invention.

FIG. 6 is a circuit diagram of a playback signal detection circuit according to another embodiment of the present invention. The playback signal detection circuit detects the time delay of a playback signal, which is caused by different shape conditions of data pits recorded on a disc or interference between data, from each output of an n-division photodetector, and compensates for the time delay centering on data of a short period. To improve the degree of modulation, it is important that the short-period signal is not deteriorated due to a time delay.

A P/U 302, first through fourth I/Vs 306, 308, 310 and 312, and first and second adders 314 and 316 are the same as those of FIG. 2, and thus a description of the structures and operation thereof will be omitted. The description will be focused on a time delay compensator 318.

A band pass filter (BPF) 320 of the time delay compensator 318 receives the output of a subtracter 330, which is fed back, and provides only a signal of a band that corresponds to data of a predetermined period, to a peak holder 322. The data of a predetermined period may be data of a short period. The peak holder 322 holds and provides the peak of the output of the BPF 320 to an analog-to-digital converter (ADC) 324. The ADC 324 converts the output of the peak holder 322 into digital data and outputs the digital data to a minimum value detector 326. The minimum value detector 326 detects the minimum value of the ADC 324 while repeating the step of receiving the output of the ADC 324 via the subtracter 330, the BPF 320 and the peak holder 322. After detecting the minimum value of the ADC 324, the minimum value detector 326 provides time delay compensation data, which corresponds to the difference between the output of the ADC 324 and the detected minimum value, to a delay unit 328.

The delay unit 328 shifts the output of the second adder 316 by time corresponding to the time delay compensation data provided from the minimum value detector 326 and simultaneously provides the shifted output to the subtracter 330 and a third adder 332. The subtracter 330 subtracts the output B+C of the photodetector 304, which has been compensated for time delay and provided from the delay unit 328, from the output A+D of the photodetector 304, which is provided from the first adder 314, and negatively feeds back the result of the subtraction to the BPF 320. The third adder 332 sums the output of the first adder 314 and the output of the delay unit 328 to provide a playback signal RF SUM which is compensated for time delay.

The apparatus of FIG. 6 compensates for the time delay between the outputs of the photodetector 304, which correspond to data of a short period, thereby improving the degree of modulation of a signal, which is essential to signal processing, and, furthermore, increasing the performance of the system.

As described above, the present invention compensates for the time delay between the outputs of a photodetector, thereby increasing the degree of modulation of a data playback signal. In addition, the present invention maximally suppresses the distortion or degradation of a signal and minimizes the occurrence of errors in a playback signal, thereby improving the reliability of the playback signal. Moreover, when a playback signal, which is generated according to the present invention, is used, defocus margin, detrack margin, radial tilt margin and tangential tilt margin are increased, thereby increasing the performance of the system.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of detecting a playback signal using a photodetector which multi-divides an optical signal reflected from an optical recording medium for detection, the method comprising:

detecting a time difference between first and second signals derived from the photodetector and temporally matching the first and second signals to compensate for the time difference; and summing the matched signals to provide the playback signal, wherein:

the first signal results from detecting information along a first tangential line of the optical recording medium and the second signal results from detecting information along a second tangential line of the optical recording medium; and the detecting of the time difference and the temporally matching comprises:

temporally shifting the second signal according to a time delay compensation signal, subtracting the temporally shifted second signal from the first signal to provide a subtraction result, detecting a peak signal of a band corresponding to data of a predetermined period from the subtraction result, and determining a minimum value of the peak signal, a current value of the peak signal and a difference between the peak signal minimum value and the current signal peak value to provide the time delay compensation signal based on the difference.

2. The method of claim 1, wherein data of the predetermined period is data whose period is a short period in a range of data lengths from 3T to 14T.

3. A playback signal detection circuit in an optical recording and/or playback apparatus including a photodetector which multi-divides an optical signal reflected from an optical recording medium for detection, the circuit comprising:

a time delay compensator which detects a time difference between first and second signals derived from the photodetector and temporally matches the first and second signals to compensate for the time difference; and an operational unit which sums the matched signals to provide a playback signal, wherein:

the first signal results from detecting information along a first tangential line of the optical recording medium and the second signal results from detecting information along a second tangential line of the optical recording medium, and wherein the time delay compensator comprises:

a delay unit which temporally shifts the second signal according to a time delay compensation signal, a subtracter which subtracts the temporally shifted second signal from the first signal to provide a subtraction result, a band pass filter which filters the subtraction result and passes only a band corresponding to data of a predetermined period as a band pass signal, a peak holder which detects a peak from the band pass signal and provides a peak holder signal, an analog-to-digital converter which converts the peak holder signal into a digital signal to provide peak data, and a minimum value detector which detects a minimum value of the peak data and provides the time delay compensation signal, which corresponds to a difference between the detected minimum value and the peak data.

4. The circuit of claim 3, wherein the data of the predetermined period is data whose period is a short period in a range of 3T to 14T.

5. A playback signal detection circuit in an optical recording and/or playback apparatus including a photodetector which multi-divides an optical signal reflected from an optical recording medium for detection, the circuit comprising:
 a time delay compensator which detects a time difference between first and second signals derived from the photodetector and temporally shifts the second signal to compensate for the time difference; and
 an operational unit which sums the first signal and the temporally shifted second signal to provide a playback signal, wherein the time delay compensator comprises:
  a delay unit which temporally shifts the second signal according to a time delay compensation signal,
  a subtracter which subtracts the temporally shifted second signal from the first signal to provide a subtraction result,
  a band pass filter which filters the subtraction result and passes a signal band corresponding to data of a predetermined period,
  a peak holder which detects a peak of the band passed signal;
  an analog-to-digital converter which converts the detected peak band passed signal to a digital peak signal, and
  a minimum value detector which: determines a minimum value of the digital peak signal; determines a current value of the digital peak signal; determines a difference between the digital peak signal minimum value and the current digital signal peak value; and provides the time delay compensation signal based on a difference between the digital peak signal minimum value and the current digital peak signal value.

6. The circuit of claim 5, wherein the data of the predetermined period is data whose period is a short period in range of 3T to 14T.

* * * * *